A. WETTENGEL.
FRUIT HARVESTER.
APPLICATION FILED DEC. 17, 1907.
907,208.
Patented Dec. 22, 1908.
2 SHEETS—SHEET 1.
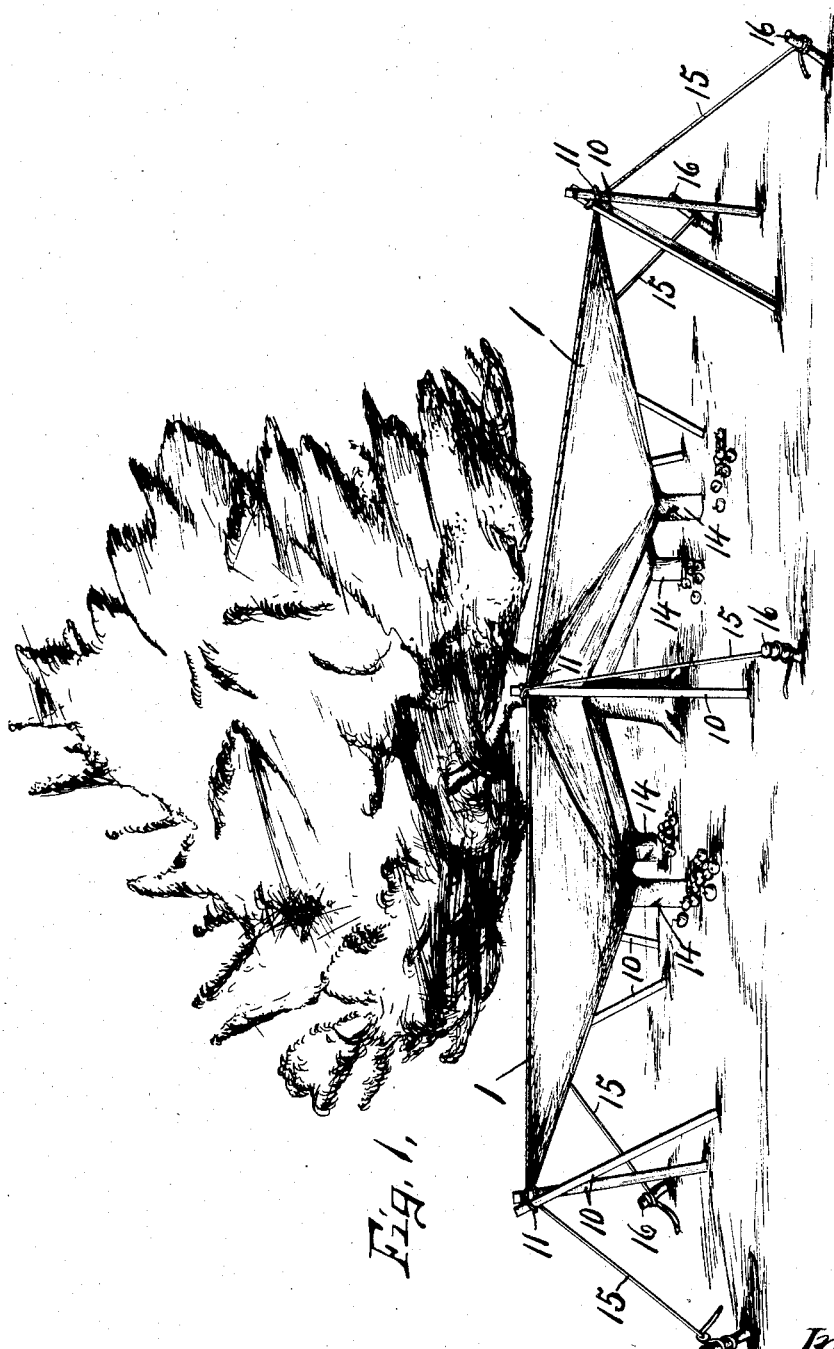

A. WETTENGEL.
FRUIT HARVESTER.
APPLICATION FILED DEC. 17, 1907.
907,208.
Patented Dec. 22, 1908.
2 SHEETS—SHEET 2.
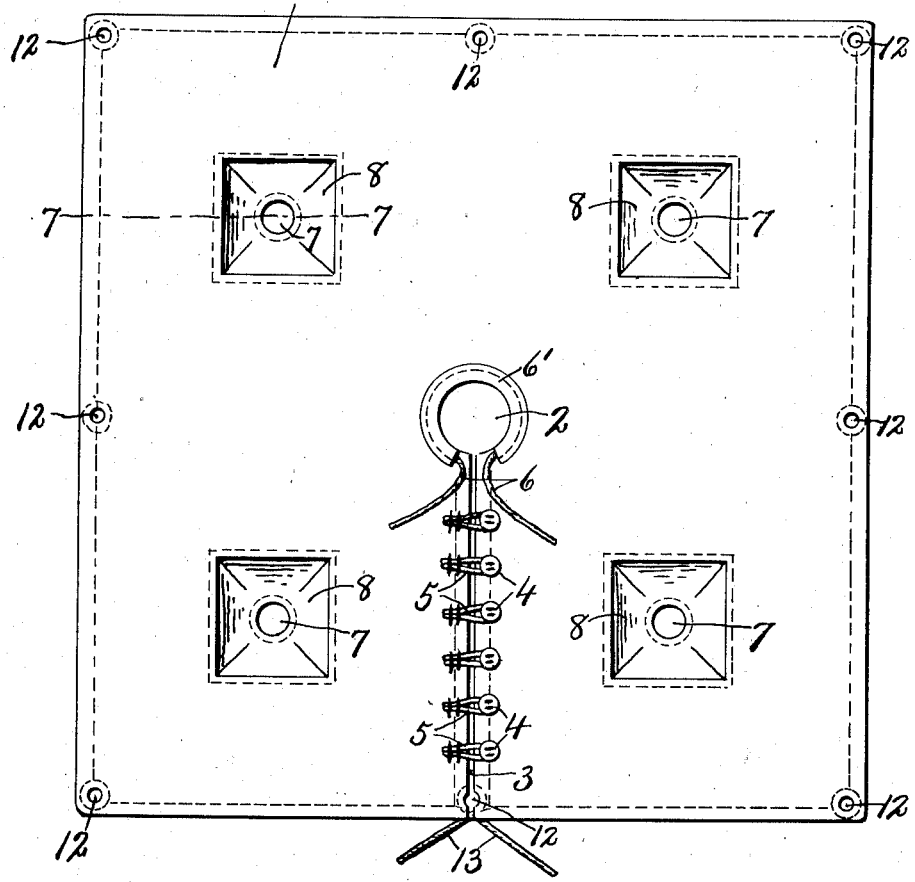
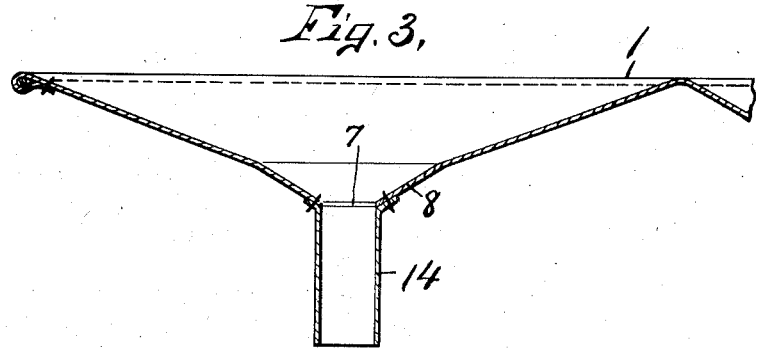

UNITED STATES PATENT OFFICE.

AUGUSTUS WETTENGEL, OF FULTON, NEW YORK.

FRUIT-HARVESTER.

No. 907,208.  Specification of Letters Patent.  Patented Dec. 22, 1908.

Application filed December 17, 1907. Serial No. 406,883.

*To all whom it may concern:*

Be it known that I, AUGUSTUS WETTENGEL, of Fulton, in the county of Oswego, in the State of New York, have invented new and useful Improvements in Fruit-Harvesters, of which the following, taken in connection with the accompanying drawings, is a full, clear, and exact description.

This invention relates to certain improvements in fruit harvesters in the form of a sheet of canvas or other suitable material adapted to be spread and supported underneath the tree top and around the trunk for the reception of the fruit as it is shaken or otherwise dislodged from the tree. This sheet is preferably made continuous and substantially coextensive with the ground area covered by ordinary orchard trees, and my main object is to construct it in such manner that it may be readily installed and taken down and shifted from one tree to another. In other words I have sought to facilitate the installation of the canvas by dividing it from the center through one side whereby it may be readily drawn around and tied to the trunk of the tree at a suitable elevation and the meeting edges at the division attached by any suitable detachable fastening means thereby constituting a practically continuous sheet capable of being spread over a ground area substantially equal to that covered by the top of the tree.

Another object is to support the corners and central portion of the lengthwise edges of the sheet in an elevated position in approximately the same plane or slightly above that of the central portion thereby forming a series of, in this instance four, canvas hoppers one in each quarter of the canvas, the central portion of each quarter of the canvas sagging by its own weight at the center where it is provided with an opening and a pendent chute to which the fruit dropping upon the canvas is diverted by rolling along the inclined sides of each quarter, said fruit being finally discharged through the chute and on to the ground in piles where it may be more readily collected in suitable receptacles provided therefor. It is evident, however, that the canvas may be enlarged or reduced and that the number of hoppers will be usually dependent upon the position and number of the supporting poles. The main object, however, is to provide the canvas sheet with a plurality of openings spaced a suitable distance apart and to support the canvas in such manner that the portions thereof, provided with openings will assume the form of a hopper with the openings at the low points therein; the general purpose being to enable the fruit to be shaken and quickly collected from each tree without materially bruising such fruit.

Other objects and uses will be brought out in the following description.

In the drawings—Figure 1 is a perspective view of my improved fruit harvester shown as operatively mounted under a fruit tree ready for shaking the fruit there into. Fig. 2 is a top plan on a small scale of the detached canvas sheet and Fig. 3 is a sectional view taken on line 7—7, Fig. 2, except that the central apertured portion of the canvas is shown in its sagging position with the opening and chute at the low side.

In carrying out the objects stated, I provide a rectangular sheet —1— of canvas or other suitable flexible material with a central opening —2— and a transverse division —3— extending from the central opening —2— through one side of the canvas to enable the entire canvas to be readily drawn around the trunk of the fruit tree with the trunk extending through the central opening —2—, the meeting edges of the transverse division —3— being afterward tied together by suitable fastening means as buttons —4— and loops —5— although any other suitable fastening means may be substituted. The central portion of the canvas is secured to the tree by suitable fastening as a rope or cord tie —6— which is shirred in a suitable seam —6'— surrounding the opening —2— so that the cord —6— may be drawn up tightly around the trunk of the tree and its ends tied together to hold the central portion of the canvas in an elevated position some distance from the ground. This canvas is also provided with a series of openings —7— which are located in diagonal lines running from corner to corner and substantially equi-distant from the central opening —2— and the four corners of the canvas, said openings being in this instance, formed hopper shape having extensions of the same material which are permanently secured to form a part of the main canvas sheet.

After the canvas is drawn around and secured to the trunk of the tree in the manner just described, its four corners and also the intermediate portions midway between the corners are supported in an elevated position some distance above the ground upon suitable poles —10—, the upper ends of said poles being fastened to the adjacent edges of the canvas by suitable fastening means as cords or similar tie pieces —11— which are passed through eyelets —12— in the marginal edges of the canvas, said marginal edges being reinforced by cords—13—, around which the edges of the canvas are hemmed.

By supporting the entire canvas in the manner just described, it is obvious that the portions thereof in which the apertures —7— and hoppers —8—, are formed will sag to a plane some distance below that of the marginal edges and center of the canvas thereby constituting a series of in this instance four comparatively large hoppers underlying the branches or top of the tree so that by shaking the branches to dislodge the fruit, the latter will fall upon the flexible canvas and immediately gravitate along its inclined sides to and through the openings —7— where they are conducted to the ground through suitable chutes —14— which are secured to the canvas around the openings —7— and depend some distance therefrom into close proximity to the ground, where the apples collect in piles and may be conveniently gathered into baskets, crates or other suitable receptacles provided therefor.

The poles —10— may be held in an upright position against the strains, to which they are subjected by the weight of the canvas and fruit which may gravitate thereupon, by any suitable fastening means as guy wires or cords —15— which are secured at one end to the upper ends of the poles and the opposite ends secured to suitable stakes or anchors —16— which are driven into the ground in the well known manner of anchoring tents.

Although I have described a particular manner of constructing the canvas fruit collector, it is evident that many changes may be made therein without departing from the spirit of my invention which is primarily to provide a canvas with a central opening for receiving the trunk of the tree and to divide the canvas transversely from the opening through one side and also to provide portions of the canvas between the central opening and marginal edges with one or more openings through which the fruit falling upon the canvas will readily gravitate and discharge through the chute —14— in individual piles and, in addition to this, supporting the marginal edges of the canvas in such manner that the portions thereof having the discharge opening —7— will sag to a plane some distance below said marginal edges in order that the fruit falling upon said canvas may readily gravitate to said opening.

What I claim is:

1. A fruit harvester comprising a sheet of flexible material having a central opening and slitted transversely from said opening through one side, said sheet furthermore provided with a plurality of hoppers positioned at points between the central opening and the marginal edge of the sheet, the said hoppers depending below the plane of said sheet, a discharge tube communicating with each of the hoppers, means for connecting together the edges of said slit, and means for supporting the center and marginal edges of the sheet in a plane above the hoppers.

2. A fruit harvester comprising a sheet of flexible material having a central opening and slitted transversely from said opening through one side, said sheet furthermore provided with a plurality of hoppers positioned at points between the central opening and the marginal edge of the sheet, said hoppers depending below the plane of said sheet, a discharge tube communicating with each of the hoppers, means for connecting together the edges of said slit, means for supporting the center and marginal edges of the sheet in a plane above the hoppers, and means whereby the sheet will be made to snugly engage the trunk of the tree which the sheet surrounds.

In witness whereof I have hereunto set my hand this second day of December 1907.

AUGUSTUS WETTENGEL.

Witnesses:
ARVIN RICE,
MABELLE F. LEWIS.